United States Patent
Meuleman (10) Patent No.: US 10,449,669 B2
(45) Date of Patent: Oct. 22, 2019

(54) MANIPULATOR MECHANISM (71) Applicant: MOOG BV, Nieuw-Vennep (NL)

(72) Inventor: Jos Meuleman, Bennebroek (NL)

(73) Assignee: Moog BV, Nieuw-Vennep (NL)

( * ) Notice: Subject to any disclaimer, the term of this patent is extended or adjusted under 35 U.S.C. 154(b) by 998 days.

(21) Appl. No.: 14/781,924

(22) PCT Filed: Mar. 20, 2014

(86) PCT No.: PCT/EP2014/055651
§ 371 (c)(1),
(2) Date: Oct. 2, 2015

(87) PCT Pub. No.: WO2014/161726
PCT Pub. Date: Oct. 9, 2014

(65) Prior Publication Data
US 2016/0031079 A1 Feb. 4, 2016

(30) Foreign Application Priority Data
Apr. 3, 2013 (GB) .................................. 1305989.4

(51) Int. Cl.
B25J 9/10 (2006.01)
A61H 3/00 (2006.01)
A63B 21/005 (2006.01)
A63B 21/00 (2006.01)
A63B 21/16 (2006.01)
A61H 1/02 (2006.01)
F16H 21/10 (2006.01)
F16H 21/18 (2006.01)

(52) U.S. Cl.
CPC ............ *B25J 9/106* (2013.01); *A61H 1/0262* (2013.01); *A61H 3/008* (2013.01); *A63B 21/0058* (2013.01); *A63B 21/00181* (2013.01); *A63B 21/152* (2013.01); *A63B 21/169* (2015.10); *F16H 21/10* (2013.01); *A61H 2201/1436* (2013.01); *A61H 2201/1481* (2013.01); *A61H 2201/163* (2013.01); *A61H 2201/1628* (2013.01); *A61H 2201/1652* (2013.01); *F16H 21/18* (2013.01)

(58) Field of Classification Search
CPC .................. A61H 1/0262; A61H 3/008; A61H 2201/1628; B25J 9/106; B25J 9/1065
See application file for complete search history.

(56) References Cited

U.S. PATENT DOCUMENTS

| 5,326,218 A | 7/1994 | Fallas |
| 6,095,011 A * | 8/2000 | Brogardh ............... B25J 9/1065 248/278.1 |
| 6,821,233 B1 * | 11/2004 | Colombo .............. A61F 5/0102 482/54 |
| 7,125,388 B1 | 10/2006 | Reinkensmeyer et al. |
| 7,998,040 B2 * | 8/2011 | Kram ................. A63B 21/4015 482/124 |

(Continued)

FOREIGN PATENT DOCUMENTS

EP 1052071 11/2000

*Primary Examiner* — Timothy A Stanis
(74) *Attorney, Agent, or Firm* — Hodgson Russ LLP (57) ABSTRACT A manipulator (110) for e.g. gait training is constructed from an Evans mechanism with an additional degree of freedom to provide a two dimensional workspace.

12 Claims, 7 Drawing Sheets (56) References Cited

U.S. PATENT DOCUMENTS

2006/0241539 A1* 10/2006 Agrawal ................ B25J 9/0006
602/23
2008/0255488 A1* 10/2008 Agrawal .......... A63B 21/00181
602/23

* cited by examiner

MANIPULATOR MECHANISM

CROSS-REFERENCE TO RELATED APPLICATIONS

The present application is the U.S. national phase of International Application No. PCT/EP2014/055651 filed Mar. 20, 2014, which claims priority of British Application No. 1305989.4 filed Apr. 3, 2013, the entirety of which is incorporated herein by reference.

FIELD OF THE INVENTION

The present invention is concerned with a manipulator. More specifically the present invention is concerned with a 2 degree of freedom manipulator comprising an end effector which can be moved in an uncoupled sense in two substantially perpendicular linear directions in a planar workspace.

Two degree of freedom manipulators have many uses. For example, they may be used in the manipulation of an end effector such as a robot arm or machine tool in order to pick and place and object, or perform a manufacturing operation on a component.

BACKGROUND OF THE INVENTION

Another application for two degree of freedom manipulators is in the use of rehabilitation robots in order to provide support and/or assistive forces to a patient undergoing rehabilitation. Such manipulators are attached to a body part of the subject and can be used to provide assistive forces and support during a rehabilitation exercise such as gait training.

For example, a 2DOF manipulator may be connected to a subject's pelvis to support their weight and provide predetermined gait cues to assist in walking One such manipulator is shown in US2007/0016116. In this document, a pair of pneumatically driven manipulators apply forces to the subject's pelvis with an arrangement of cylinders. In particular, fore-aft movement of the subject is provided by pneumatic cylinders mounted in the fore-aft direction, and lateral movement is provided by laterally orientated pneumatic cylinders. A problem with this arrangement is that the lateral cylinders mean that the manipulator is quite wide. This makes it more difficult to install, and the laterally extending pneumatic cylinders may clash with the subject's arms during normal gait motion. Also, the workspace is quite small compared to the size of the manipulator.

A different, known, 2DOF manipulator comprises a 2D Cartesian slideway arrangement in which a carriage is slidable on a first rail in a first direction, which first rail is slideable between two further parallel rails in a second direction, perpendicular to the first. Such systems have certain disadvantages.

One disadvantage is that there is a significant amount of equipment surrounding and within the workspace. This is generally undesirable in many applications, as the manipulator and the workpiece or subject may clash, and in the event that the manipulator is used for gait training, the rails may clash with the subject's arms.

Another disadvantage with such systems is that sliding joints between components are generally undesirable because they are prone to contamination and wear.

Also, in such a system a motor is provided to move the carriage on the first rail. The provision of a motor attached to the first rail, and arranged to move the carriage, means that the first rail has a high inertia, which is undesirable when being moved on the parallel rails.

SUMMARY OF THE INVENTION

It is an object of the present invention to overcome or at least mitigate the above referenced problems.

According to the first aspect of the invention, there is provided a manipulator comprising:
  a frame;
  a first link;
  a second link; and,
  a first coupler;
  arranged to form an Evans straight-line mechanism such that a point on the first coupler describes a substantially straight line in a first direction for a part of its locus;
  wherein the second link is attached to the frame via a crank, such that actuation of the crank moves the point on the first coupler in a substantially straight line in a second direction, perpendicular to the first direction.

The invention provides an Evans mechanism in which an additional degree of freedom is provided at the mounted end of one of the driver arms. The actuation of the additional crank provides motion in the degree of freedom perpendicular to the normal linear degree of freedom of the Evans mechanism. This arrangement has many advantages. Firstly, the majority of the mechanism is placed outside of the workspace and rearwardly thereof. Secondly the arrangement only uses rotational joints, which do not suffer the disadvantages of linear joints per the prior art.

Preferably:
  L1 is the distance along the second link (122; 222) between an axis of rotation with the coupler (118; 218) and an axis of rotation with the crank (144; 248);
  L2 is the distance along the coupler (118; 218) between an axis of rotation with the first link (114; 214);
  L3 is the distance along the coupler (118; 218) between the axis of rotation with the coupler (118; 218) and the end point (128; 228);
  in which the manipulator is configured such that L2 is within 10% of the value determined by $L2^2 = L1 * L3$.

This provides a good approximation to a straight line throughout a significant portion of the travel of the end point.

Preferably the mechanism comprises a first actuation assembly having a first motor configured to articulate the manipulator to move the point on the first coupler in the first direction. Preferably the first actuation assembly comprises a third link, driven by a first actuation assembly crank, which is driven by the first motor, in which the third link is arranged to drive the first coupler.

Preferably the third link is attached to the first coupler between the first link and the second link.

Preferably the manipulator comprises:
  a second coupler connected to the first coupler and configured to move therewith; and,
  an end effector connecting the first and second couplers.
This provides a more stable mechanism, and allows an end effector to be used which transfers torques as well as point forces. Preferably the first and second couplers are connected by a coupler connector spaced from the end effector. Preferably the first and second couplers are connected by the end effector and coupler connector so as to form two parallel sides of a parallel linkage.

The manipulator may comprise a further second link connected to the second coupler, wherein the further second link is attached to the frame via a further crank, such that actuation of the crank moves a point on the second coupler in a substantially straight line in the second direction.

Preferably the crank and the further crank are arranged for synchronised motion. The crank and the further crank may be driven by a common actuation assembly, for example the first motor may drive the first crank and the further crank via a common pushrod.

BRIEF DESCRIPTION OF THE DRAWING VIEWS

An example manipulator in accordance with the present invention will now be described with reference to the following figures.

DETAILED DESCRIPTION OF THE INVENTION

Figure 1:
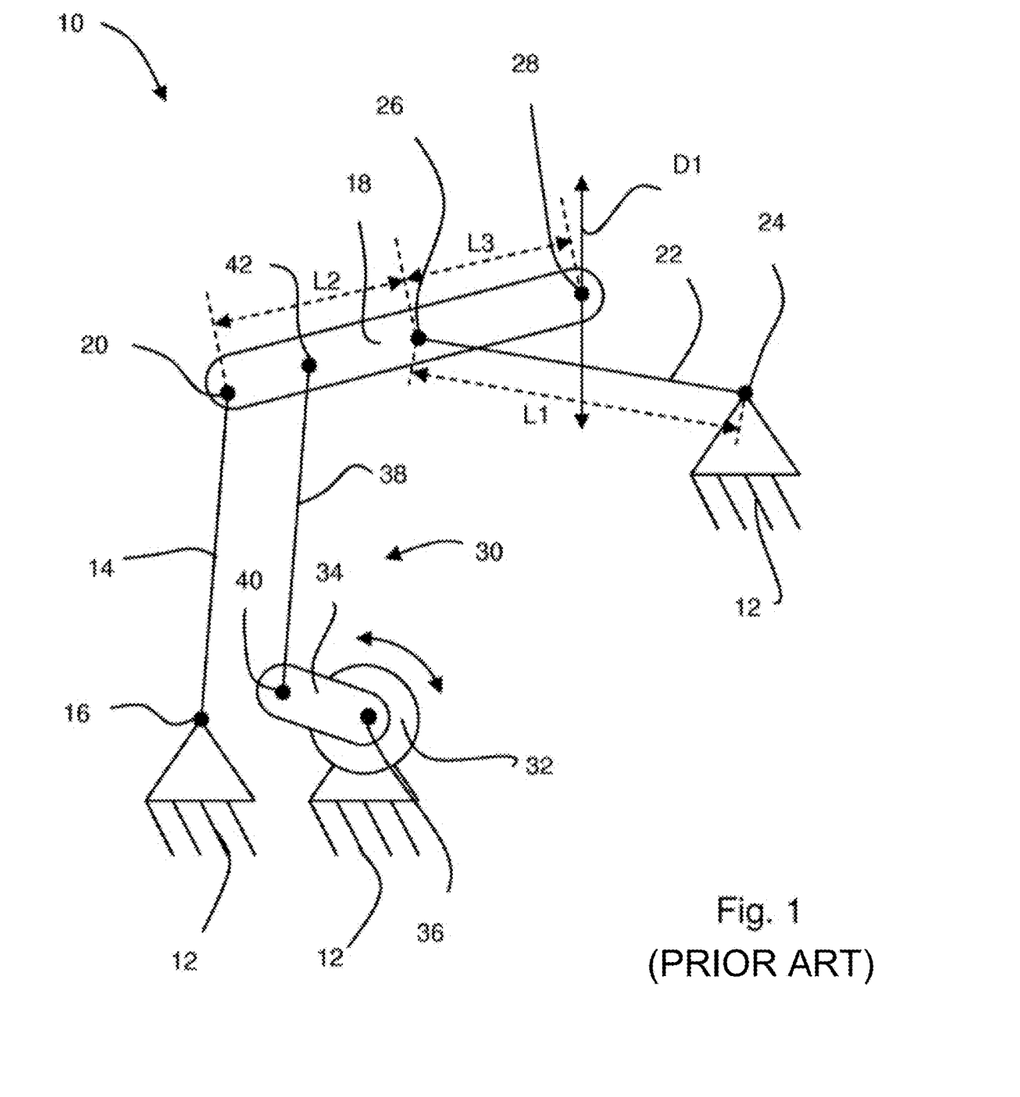
FIG. 1 is a side schematic view of a known Evans mechanism.

Turning to FIG. 1, a known Evans mechanism 10 is shown schematically. The Evans mechanism 10 comprises a frame 12 which is fixed in use. The different areas of the frame 12 in FIG. 1 are rigidly attached to each other.

A first link 14 is provided, and pivotably connected to the frame 12 at a first joint 16 positioned at a first end of the first link 14.

A coupler 18 is provided which is pivotably connected via a second rotational joint 20 to the first link 14 at a second end of the first link 14 and a first end of the coupler 18.

A second link 22 is pivotably connected to the frame 12 via a third rotational joint 24 at a first end thereof. A second end of the second link 22 is pivotably connected to the coupler 18 via a fourth rotational joint 26.

In FIG. 1, L1 is the distance between the third and fourth joints 24, 26 on the second link 22. L2 is the distance from the second joint 20 to the fourth joint 26 on the coupler 18 and L3 is the distance between the fourth joint 26 and the end point 28 (i.e. the point which is to be manipulated). The mechanism is configured such that $L2^2=L1*L3$, which provides the most accurate straight line motion for the end point 28.

The first rotational joint 16 and the third rotational joint 24 connecting the links 14, 22 with the frame 12 are spaced apart. It will also be noted that the rotational joints 16, 20, 24, 26 are positioned such that the first and second links 14, 22 are approximately 90 degrees to each other.

The frame 12, first and second links 14, 22 and the coupler 18 form a four bar link mechanism known in the art as an Evans mechanism. The coupler 18 extends from the first rotational joint 20 past the fourth rotational joint 26 to an end point 28. When the first link 14 rotates clockwise about the first rotational joint 14, and the second link 22 rotates about the third rotational joint 24, linear motion of the end point 28 in direction D1 results.

The geometry of the mechanism (as described by $L2^2=L1*L3$) dictates that for a significant part of the locus of the endpoint 28 during actuation, a substantially, or an approximation of linear motion is observed. Should the mechanism be actuated far beyond the position shown in FIG. 1, then the path of the end point 28 will deviate away from linear direction D1 and become curved, however for a significant proportion of the movement of the mechanism, the path is linear. As such, the Evans mechanism is also known as a "straight line mechanism".

The Evans mechanism may be actuated in several ways. In the embodiment shown in FIG. 1, the Evans mechanism 10 is actuated by a separate actuation assembly 30.

The actuation assembly 30 comprises a first motor 32 which is mounted to the frame 12. The motor 32 forms a fifth rotational joint 36, about which a crank 34 is driven. A third link 38 is attached to a free end of the crank 34 via a sixth rotational joint 40 and to the coupler at a seventh rotational joint 42. The seventh rotational joint 42 is positioned between the second rotational joint 20 and the fourth rotational joint 26 on the coupler 18. Using the actuation assembly 30 the motor 32 can drive the crank 34 which in turn will push or pull the coupler 18 via the third link 38 to actuate the Evans mechanism and drive the end point 28 along in direction D1.

It will be noted that other types of actuation assembly are possible, for example, rotation of the first or second links 14, 22 can be achieved by providing motors at the first or third rotational joints 16 or 24. Provision of a motor at the joint 16 may be problematic depending on the range of motion used at a position where the coupler 18 and the second link 22 are parallel, rotation of the joint 16 would not be possible via a torque about the centre of rotation of the joint.

Figure 2:
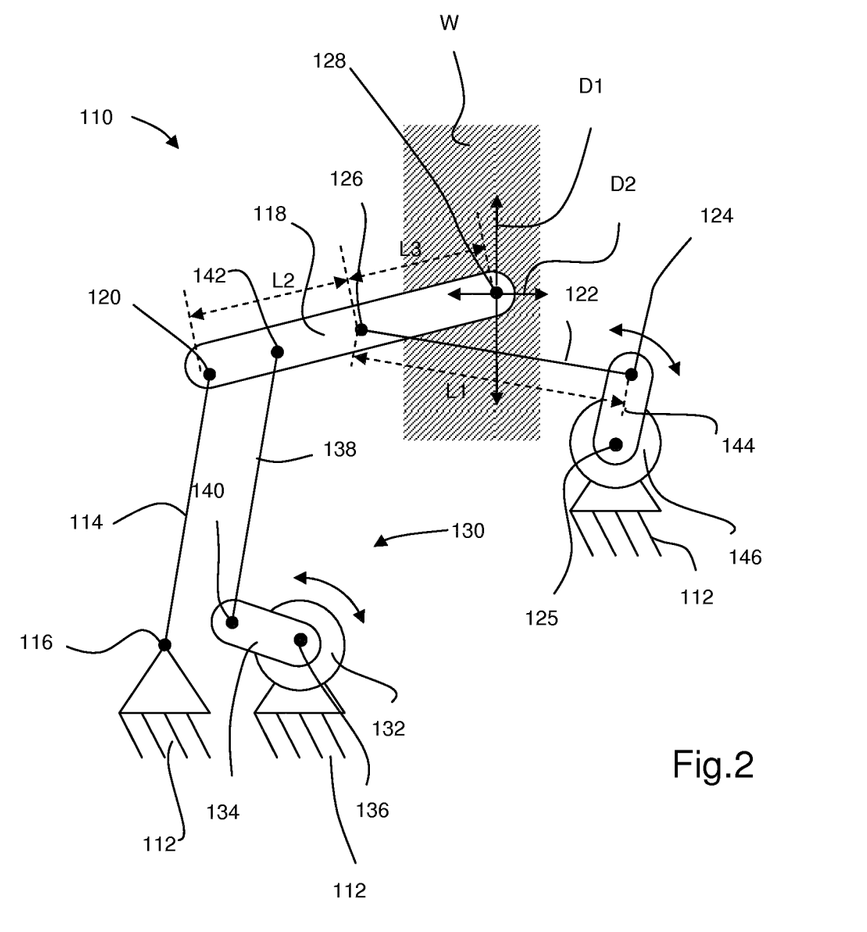
FIG. 2 is a side schematic view of a first mechanism in accordance with the present invention.

The Evans mechanism of FIG. 1 can be used as a one degree of freedom manipulator. The present invention provides a 2 degree of freedom mechanism. This is achieved by the arrangement shown in FIG. 2. The reference numerals shown in FIG. 2 are similar to those shown in FIG. 1 for common features, albeit incremented by 100.

A two degree of freedom mechanism 110 in accordance with the present invention comprises a frame 112, a first link 114 connected to the frame 112 via a first rotational joint 116 and connected to a coupler 118 via a second rotational joint 120. A second link 122 is provided being connected to the coupler 118 via a fourth rotational joint 126. An actuation assembly 130 is provided, being substantially similar to the actuation assembly 30, having a first motor 132 defining a fifth rotational joint 136, a first crank 134 driven by the motor and a third link 138 connected between a sixth rotational joint 140 on the crank and a seventh rotational joint 142 on the coupler 118.

Instead of being directly attached to the frame 112, the second rotational link 122 is connected to a second crank 144 at a third rotational joint 124, which crank in turn is driven by a second motor 146 which is mounted on the frame 112, the second motor forming an eighth rotational joint 125.

With the second crank 144 in a stationary position, the mechanism 110 acts in substantially the same manner as the Evans mechanism of FIG. 1. The end point 128 of the coupler 118 moves in direction D1 when the mechanism is actuated by the first motor 132.

Per FIG. 1, L1 is the distance between the third and fourth joints 124, 126 on the second link 122. L2 is the distance from the second joint 120 to the fourth joint 126 on the coupler 118 and L3 is the distance between the fourth joint 126 and the end point 128 (i.e. the point which is to be manipulated). The mechanism is configured such that $L2^2=L1*L3$, which provides the most accurate straight line motion for the end point 128.

However, it will be noted that the second crank 144 can also be driven in order to move the end point 128 of the coupler 118 in a direction D2, which is substantially perpendicular to the direction D1. As such a two-dimensional workspace W is formed in which the end point 128 is moved linearly in two, normal, directions.

It will be noted that for the range of movement around the position shown in FIGS. 2, D1 and D2 are substantially straight and perpendicular. Movement out of the workspace W will result in progressively less rectilinear behaviour.

Figure 3A:
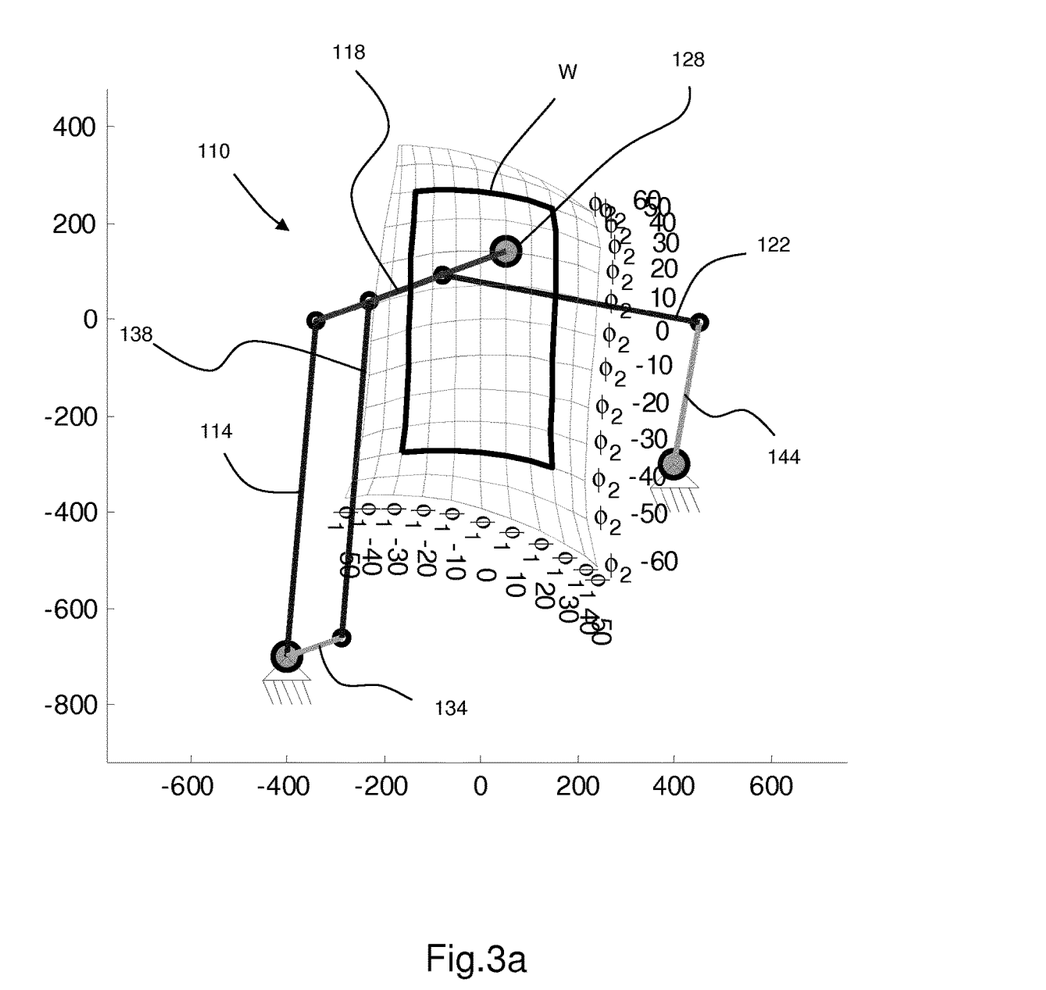
FIGS. 3a to 3e are schematic views of the range of motion of the mechanism of FIG. 2.

Turning to FIG. 3a, a mechanism similar to that of FIG. 2 is shown with its range of movement through a finite number of angles of both the degrees of freedom of the first and second cranks 134, 144. It will be noted in FIG. 3a that the first crank 134 is attached to the frame at the same point as the first link 114, but this does not significantly affect the kinematics of the mechanism.

The angle $\varphi 1$ represents the angle of the first crank 134 from its central position shown in FIG. 3a, and the angle $\varphi 2$ represents the angle of the second crank 144 about its central position shown in FIG. 3a.

Figure 3B:
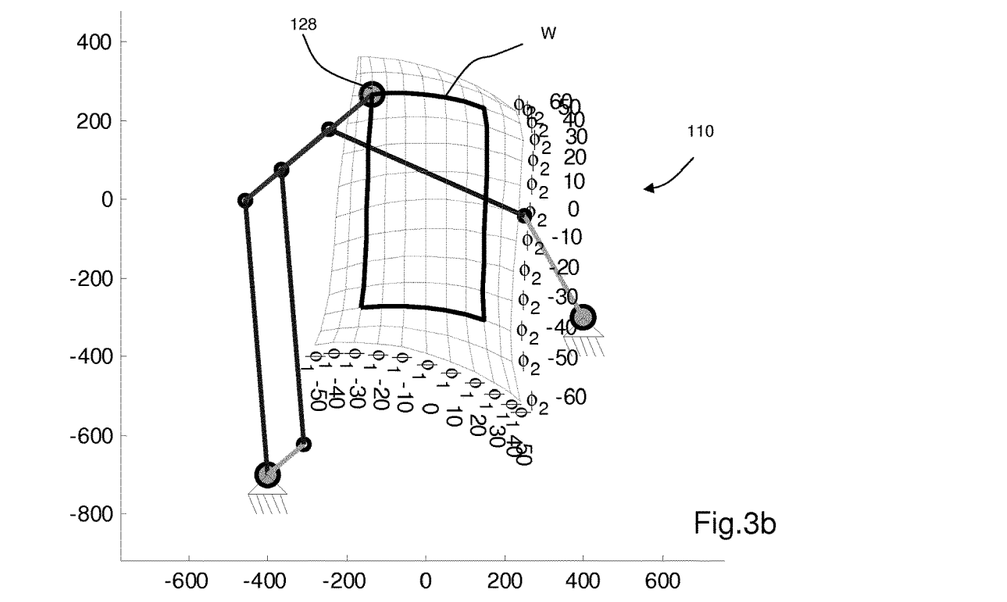
Figure 3C:
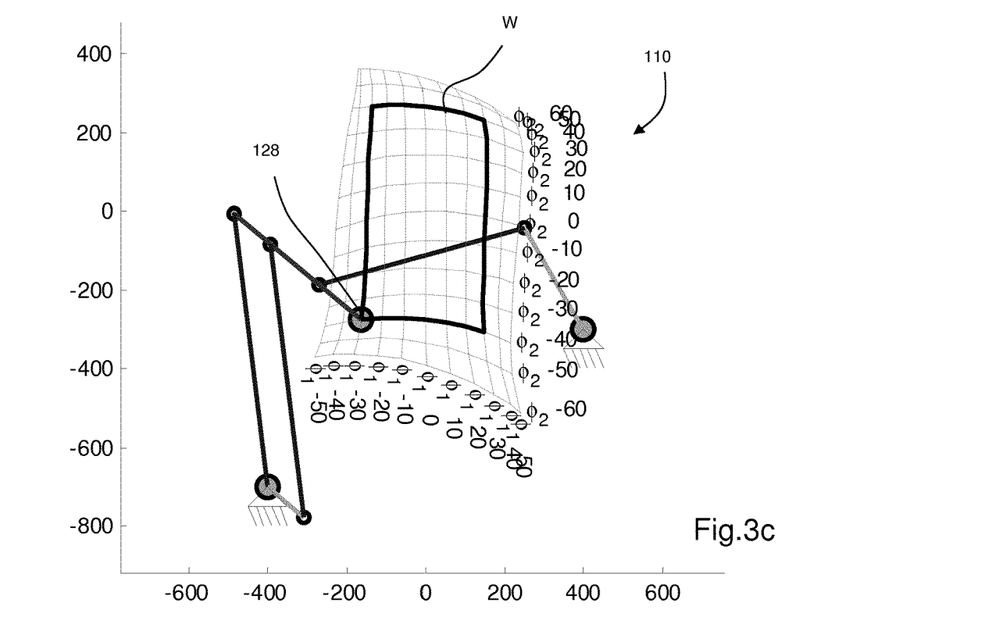
Figure 3D:
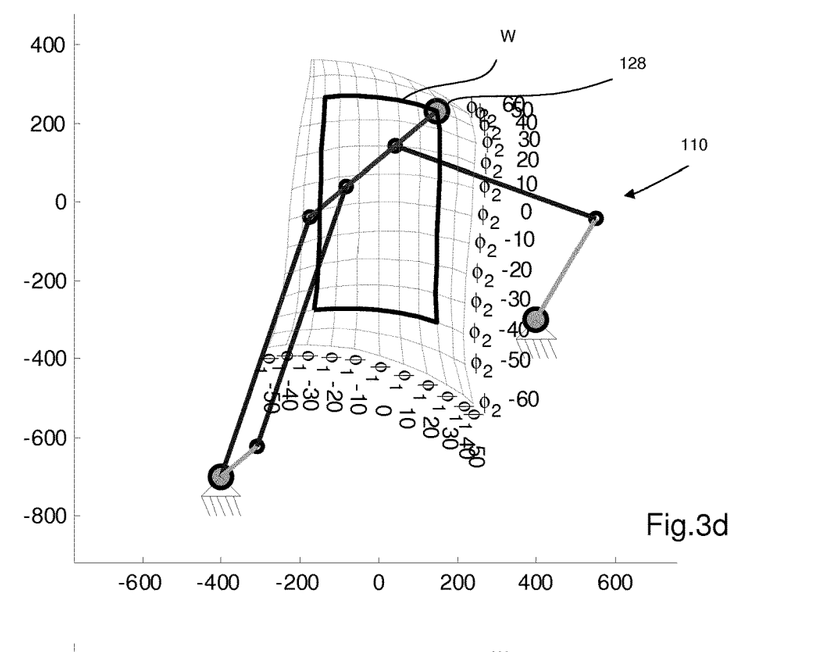
Figure 3E:
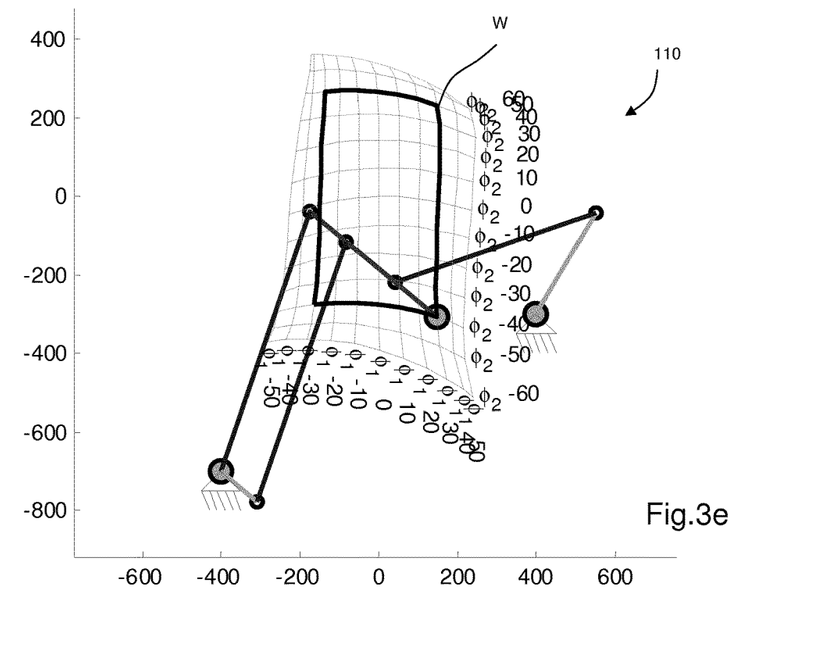

FIG. 3a shows the mechanism 110 at a position within the workspace W. Turning to FIG. 3b, the mechanism 110 is shown at a first corner of the workspace W, beyond which point the motion of the end point 128 becomes less linear. At the position of FIG. 3b, $\varphi 1$ is at −30 degrees and $\varphi 2$ at 40 degrees. Similarly, in FIGS. 3c ($\varphi 1$=−30, $\varphi 2$=−40), 3d ($\varphi 1$=30, $\varphi 2$=−40) and 3e ($\varphi 1$=30, $\varphi 2$=−40) the mechanism 110 is shown at the extreme of movement after which its motions becomes significantly less linear i.e. outside of the defined workspace W.

As can be seen by the gridlines in each of FIGS. 3a to 3e, motion of the end point 128 is relatively rectilinear and provides a good approximation to a 2 degree of freedom manipulator, such as the Cartesian slide manipulator mentioned earlier.

In the embodiments of FIGS. 2 and 3a to 3e, it may be desirable to attach a pushrod to the endpoint 128 in direction D1 (away from the mechanism 110). For example in a gait rehabilitation robot, a pushrod can be attached to the lower back of the subject. As mentioned, such robots need to guide the subject, and as such must resist forces from the subject to the mechanism.

For provision of such a pushrod, it may be desirable to lock the rotation of the endpoint or to place the effective point outside the mechanism. For this purpose, referring to FIG. 4, there is shown a mechanism 210 which is better suited to reacting the forces from the subject via a pushrod by locking the rotation of an end effector. The mechanism has some components in common with the mechanism 110 as shown in FIG. 2. These will be numbered 100 greater.

Figure 4:
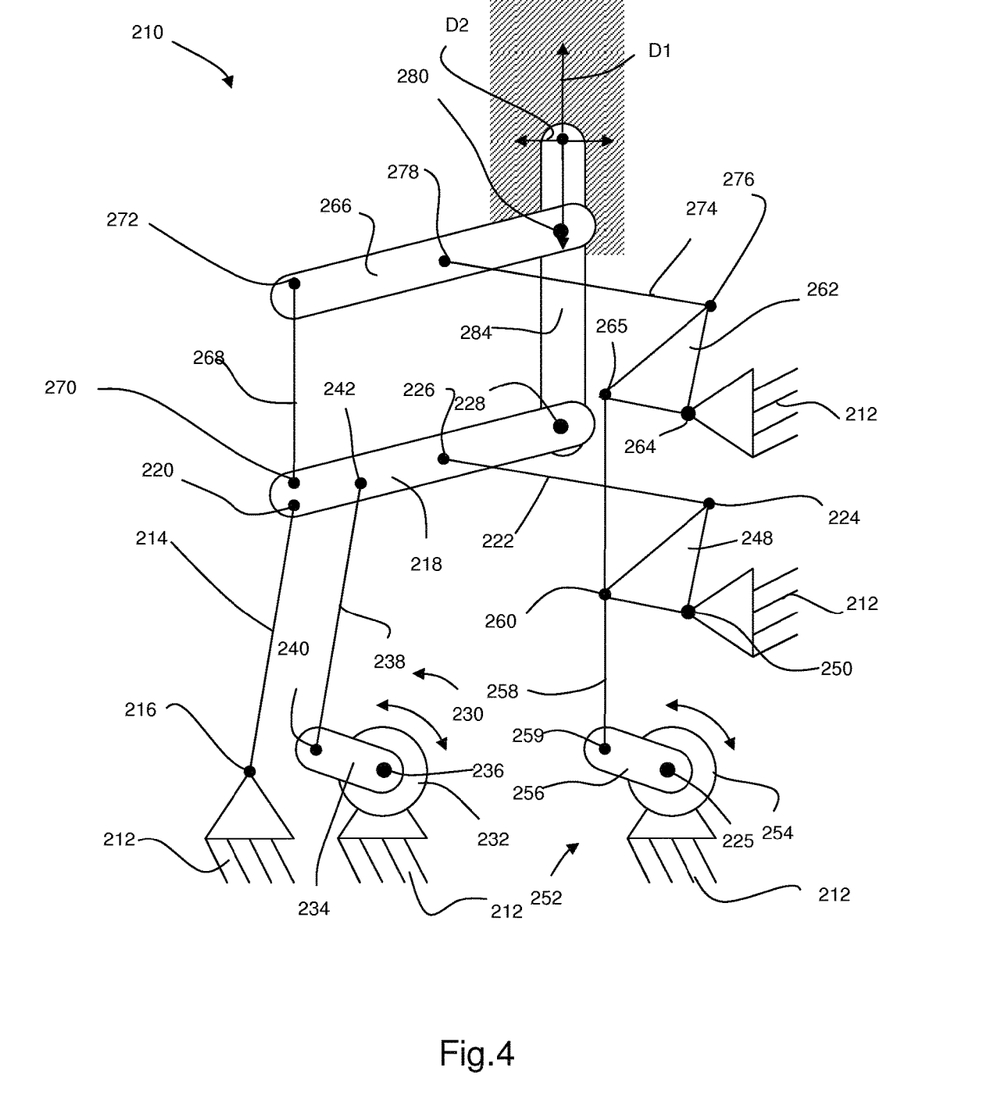
FIG. 4 is a side schematic view of a second mechanism in accordance with the present invention.

The mechanism 210 comprises a frame 212, to which a first link 214 is pivotably attached via a first rotational joint 216 at a first end and pivotably attached via a second rotational joint 220 to a first coupler 218 at the second end.

A second link 222 is connected to a first rocker 248 (to be described in more detail below) via a third rotational joint 224 and to the first coupler 218 via a fourth rotational joint 226. As with the mechanism 110 an actuation assembly 230 comprising a first motor 232 defining a fifth rotational joint 236, a first crank 234 driven by the first motor 232 and a third link 238 connected to the crank 234 via a sixth rotational joint 240 and to the coupler 218 via a seventh rotational joint 242.

A second actuation assembly 252 is provided comprising a motor 254 connected to the frame 212 and defining an eighth rotational joint 225. The assembly 252 comprises a crank 256 and a push rod 258 connected to the crank 256 via a ninth rotational joint 259.

The first rocker 248 is a member mounted for rotation to the frame 212 via a tenth rotational joint 250. The rocker 248 is driven in rotation about the tenth rotational joint 250 by the push rod 258 which is connected to the rocker 248 via an eleventh rotational joint 260. Each of the joints 224, 250, 260 on the first rocker 248 are spaced apart so as to define the vertices of a triangle.

A second rocker 262 is provided, identical to the first rocker but spaced therefrom, being attached to the frame 212 via a twelfth rotational joint 264. The push rod 258 extends beyond the first rocker 248 to drive the second rocker 262 at a thirteenth rotational joint 265. The second rocker also comprises a fourteenth rotational joint 276 as will be described below.

A second coupler 266 is provided, being generally offset and parallel to the first coupler 218. The second coupler 266 is connected to the first coupler 218 via a first intermediate link 268 and an end effector 284 (i.e. a pushrod), so as to form a parallel linkage (i.e. the opposing members are always parallel). The first intermediate link 268 is joined to the first rocker 218 via an fifteenth rotational joint 270, proximate the joint 220 and to the second rocker 262 via a sixteenth rotational joint 272. The second coupler 266 is driven by a fourth link 274 which attaches to the second rocker 262 via the fourteenth rotational joint 276, and to the second coupler 266 via a seventeenth rotational joint 278.

The end effector 284 is connected to the first coupler 218 via an eighteenth rotational joint 228 and to the second coupler 266 via a nineteenth rotational joint 280.

In use the mechanism 210 can be actuated in much the same way as the mechanism of FIG. 2. With the second motor 254 stationary, the first motor 232 drives the end effector 284 per a normal Evans mechanism i.e. in linear direction D1. It will be noted that the two couplers 218, 266 remain parallel throughout the range of motion as they are constrained by the first intermediate member 268 and the end effector 284.

Motion in direction D2 is provided by the motor 254 which drives the rockers 248, 262 to provide a vertical force through the second and fourth links 222, 274. A benefit of this particular arrangement is that the end effector 284 remains horizontal and parallel to direction D1, so that it can resist any rotational motion as required. In other words the mechanism 210 is capable of applying forces to all and any point on the end effector 284. It can be made any suitable shape to provide the desired location of the point of actuation. The system is also inherently stiffer, which is advantageous.

It will be noted that as an alternative to the rockers 248, 262, a pair of synchronised motor/crank assemblies could be used.

Figure 5:
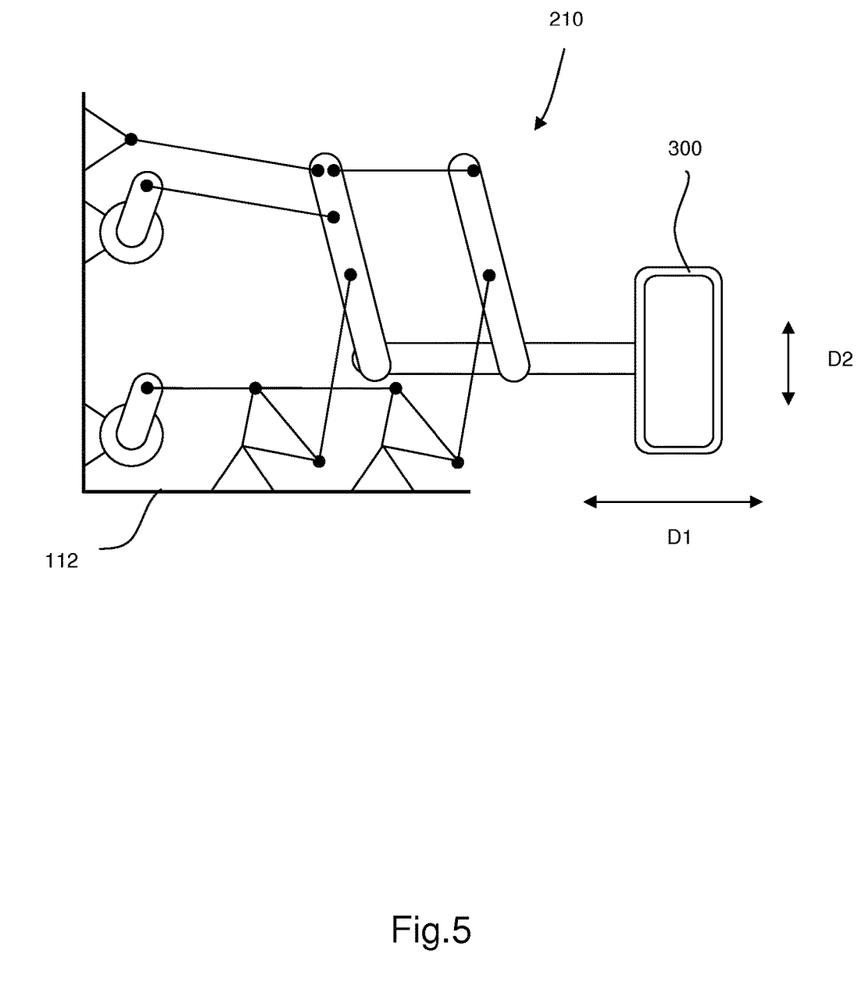
FIG. 5 is a side schematic view of an application of the mechanism of FIG. 4.

Turning to FIG. 5, the mechanism 210 is shown connected to a harness 300 for a rehabilitation patient. The mechanism 210 is arranged in the horizontal plane as shown, such that the height of the subject or patient is in a direction perpendicular to the page. As such D1 is in a fore aft direction of the subject and D2 is in a left right direction. It will be noted that the frame 212 can be provided in a stationary fashion with the subject walking on a treadmill, or alternatively can be moveable, in order to provide the ability to the patient or subject to walk. In particular during gait rehabilitation, the systems can be used to support the patient and/or provide input forces as required. In particular, the mechanism of the present invention is particularly well-suited to use with systems which utilise admittance control, so that it can be configured to be effectively "transparent" or provide restorative or input forces as required.

What is claimed is:

1. A manipulator (110; 210) comprising:
   a frame (112; 212);
   a first link (114; 214);
   a second link (122; 222);
   a first coupler (118; 218);
   a second coupler (266) connected to the first coupler (218) and configured to move therewith;
   a further second link (274) connected to the second coupler (266); and,
   an end effector (284) connecting the first and second couplers;
   wherein the frame (112; 212), the first link (114; 214), the second link (122; 222), and the first coupler (118; 218) arranged to form an Evans straight-line mechanism such that a point (128; 228) on the first coupler describes a substantially straight line in a first direction (D1) for a part of a locus of the point on the first coupler;
   wherein the second link (122; 222) is attached to the frame via a crank (144; 248), such that actuation of the crank moves the point on the first coupler in a substantially straight line in a second direction (D2), perpendicular to the first direction; and
   wherein the further second link (274) is attached to the frame via a further crank (262), such that actuation of the further crank moves a point on the second coupler in a substantially straight line in the second direction (D2).

2. A manipulator (110; 210) according to claim 1, in which:
   L1 is the distance along the second link (122; 222) between an axis of rotation with the first coupler (118; 218) and an axis of rotation with the crank (144; 248);
   L2 is the distance along the first coupler (118; 218) between an axis of rotation with the first link (114; 214);
   L3 is the distance along the first coupler (118; 218) between the axis of rotation with the first coupler (118; 218) and the point (128; 228) on the first coupler;
   in which the manipulator is configured such that L2 is within 10% of the value determined by $L2^2 = L1 \ast L3$.

3. A manipulator (110; 210) according to claim 1, comprising a first actuation assembly having a first motor (132; 232) configured to articulate the manipulator to move the point on the first coupler in the first direction.

4. A manipulator (110; 210) according to claim 3, in which the first actuation assembly comprises a third link (138; 238), driven by a first actuation assembly crank (134; 234), which is driven by the first motor (132; 232), in which the third link is arranged to drive the first coupler.

5. A manipulator (110; 210) according to claim 4, in which the third link is attached to the first coupler (118; 218) between the first link (114; 214) and the second link (122; 222).

6. A manipulator (210) according to claim 4,
   wherein the crank (248) and the further crank (262) are driven by a common actuation assembly; and
   wherein the first motor drives the first crank (248) and the further crank (262) via a common pushrod (258).

7. A manipulator (210) according to claim 1, in which the first and second couplers are connected by a coupler connector (268) spaced from the end effector.

8. A manipulator (210) according to claim 7, in which the first and second couplers (218, 266) are connected by the end effector (284) and coupler connector (268) so as to form two parallel sides of a parallel linkage.

9. A manipulator (210) according to claim 1, in which the crank (248) and the further crank (262) are arranged for synchronised motion.

10. A manipulator (210) according to claim 1, in which the crank (248) and the further crank (262) are driven by a common actuation assembly.

11. A rehabilitation apparatus comprising:
    a harness (300) for connection to a patient; and
    a manipulator according to claim 1 connected to the harness (300).

12. A gait training apparatus comprising:
    a harness (300) for connection to a patient; and
    a manipulator according to claim 1 connected to the harness (300).

* * * * *